US012396833B2

(12) United States Patent
Tan et al.

(10) Patent No.: US 12,396,833 B2
(45) Date of Patent: Aug. 26, 2025

(54) VACCINE SPRAY EQUIPMENT

(71) Applicant: FOSHAN STANDARD BIO-TECH CO., LTD., Guangdong (CN)

(72) Inventors: Zhijian Tan, Guangdong (CN); Yabiao Weng, Guangdong (CN); Lidan Liu, Guangdong (CN); Li Zeng, Guangdong (CN); Xinlin Zhong, Guangdong (CN); Yicun Lin, Guangdong (CN); Zhengpeng Liang, Guangdong (CN)

(73) Assignee: FOSHAN STANDARD BIO-TECH CO., LTD., Guangdong (CN)

( * ) Notice: Subject to any disclaimer, the term of this patent is extended or adjusted under 35 U.S.C. 154(b) by 953 days.

(21) Appl. No.: 17/612,208

(22) PCT Filed: Aug. 18, 2020

(86) PCT No.: PCT/CN2020/109688
§ 371 (c)(1),
(2) Date: Nov. 17, 2021

(87) PCT Pub. No.: WO2021/253613
PCT Pub. Date: Dec. 23, 2021

(65) Prior Publication Data
US 2022/0304787 A1    Sep. 29, 2022

(30) Foreign Application Priority Data

Jun. 15, 2020  (CN) .......................... 202021099570.8

(51) Int. Cl.
| | |
|---|---|
| A61D 1/00 | (2006.01) |
| A01K 45/00 | (2006.01) |
| A61D 1/02 | (2006.01) |
| A61D 3/00 | (2006.01) |
| A61D 7/00 | (2006.01) |
| B05B 12/12 | (2006.01) |
| B05B 13/02 | (2006.01) |
| B05B 14/00 | (2018.01) |

(52) U.S. Cl.
CPC ............ *A61D 1/025* (2013.01); *A01K 45/005* (2013.01); *A61D 3/00* (2013.01); *A61D 7/00* (2013.01); *B05B 12/122* (2013.01); *B05B 13/0257* (2013.01); *B05B 14/00* (2018.02)

(58) Field of Classification Search
None
See application file for complete search history.

(56) References Cited

U.S. PATENT DOCUMENTS

| | | | |
|---|---|---|---|
| 4,449,968 | A | 5/1984 | Peterson |
| 2002/0104485 | A1 | 8/2002 | Lewis et al. |
| 2008/0195064 | A1* | 8/2008 | Correa .................. A61P 31/12 |
| | | | 604/289 |

FOREIGN PATENT DOCUMENTS

| | | |
|---|---|---|
| CA | 2 416 726 A1 | 7/2004 |
| CN | 202136444 U | 2/2012 |
| CN | 203988478 U | 12/2014 |
| CN | 111227987 A | 6/2020 |
| EP | 1 282 470 B1 | 8/2008 |

OTHER PUBLICATIONS

International Search Report issued by the China National Intellectual Property Administration for corresponding International Patent Application No. PCT/CN2020/109688, dated Mar. 12, 2021, with an English translation.
Written Opinion of the International Searching Authority issued by the China National Intellectual Property Administration for corresponding International Patent Application No. PCT/CN2020/109688, dated Mar. 12, 2021, with an English translation.
First Office Action and Search Report with Written Opinion issued by the Brazilian Patent and Trademark Office for corresponding Brazilian Patent Application No. BR112021023628-7, mailed on Mar. 7, 2024, with an English translation.
Technical Examination Report issued by the Brazilian Patent and Trademark Office for corresponding BR Patent Application No. 112021023628-7, mailed on Sep. 23, 2024, with English translation.
First Office Action issued by the Korean Intellectual Property Office for corresponding Korean Patent Application No. 20-2021-7000070, mailed on Sep. 27, 2023, with an English translation.
Written Decision on Registration (Notice of Allowance) issued by the Korean Patent Office for corresponding Korean Patent Application No. 20-2021-7000070, mailed on Mar. 29, 2024, with an English translation.

\* cited by examiner

*Primary Examiner* — Agnieszka Boesen
(74) *Attorney, Agent, or Firm* — Myers Wolin, LLC

(57) ABSTRACT

A vaccine spray equipment includes a frame, a conveying device, a spray device and two liquid supply devices. The conveying device is disposed on the frame, and is configured to support and convey a chick frame. The spray device is provided on the frame and includes two rows of spray heads provided along the conveying direction perpendicular to the conveying device, the two rows of spray heads are provided side by side above the conveying device. The two liquid supply devices are provided on the frame. The two liquid supply devices are respectively connected to the two rows of spray heads in a one-to-one correspondence, and each of the liquid supply devices is configured to provide the spray device with vaccine suspension liquid.

15 Claims, 3 Drawing Sheets

VACCINE SPRAY EQUIPMENT

CROSS REFERENCE TO RELATED APPLICATIONS

The present application is a U.S. National Phase of International Patent Application Serial No. PCT/CN2020/109688, filed on Aug. 18, 2020, which claims priority to Chinese Application 202021099570.8, filed on Jun. 15, 2020, the contents of each of which are incorporated by reference in their entirety for all purposes.

TECHNICAL FIELD

The present application relates to the field of automation equipment, and in particular, to a vaccine spray equipment.

BACKGROUND

Coccidiosis is a very serious global parasitic disease that causes huge economic losses to the chicken industry every year. At present, anti-coccidiosis mainly depends on adding anti-coccidiosis drugs in feed or drinking water, or using coccidiosis vaccine to prevent chicken coccidiosis. Chicken coccidiosis vaccine immunization methods include drinking water, mixing (spraying) materials, dripping, spraying, and the like. At present, the main popular immunization method is drinking water immunization. After the coccidiosis vaccine and the suspending agent are mixed uniformly and put into a drinking water bottle for chicks to drink to obtain immunity. The drinking water immunization is easier to operate than methods such as mixing and dripping immunization. However, there are certain limitations in the scope of application of drinking water immunization, especially in large-scale intensive chicken farms, due to the small number of breeders, it is not suitable to use drinking water with a large workload for immunization.

In the related art, spray immunization is to dilute the vaccine and spray the vaccine through a spray equipment. The chicks can be immunized after the vaccine passes through the respiratory tract or is freely pecked. However, the spray equipment sprays small droplets, the vaccine liquid attached to the feathers is easy to evaporate and affect the pecking of chickens, and some of the droplets are suspended in the air, causing waste, and the coccidiosis vaccine must be immunized by mouth. Therefore, in the related art, the spray immunization method and equipment do not enable chicks to obtain effective anti-coccidiosis immunity.

Currently, there is a vaccine spray equipment that uses spray needles to spray vaccine suspension liquid on chicks, and attaches the vaccine suspension liquid of suitable size to the feathers for the chicks to eat. When there are no gaps or small gaps between the chick frames continuously in the equipment, the front end of the alternate chick frame could not spray liquid through the spray head, because the pump had not fully absorbed the liquid and returned to the original position.

SUMMARY

The present application provides a vaccine spray equipment to improve the effect of vaccine spraying and the efficiency of vaccine spraying.

An embodiment provides a vaccine spray equipment. The vaccine spray equipment includes a frame, a conveying device, a spray device and two liquid supply devices.

The conveying device is disposed on the frame, and is configured to support and convey a chick frame.

The spray device is provided on the frame and includes two rows of spray heads provided along the conveying direction perpendicular to the conveying device, the two rows of spray heads are provided side by side above the conveying device.

The two liquid supply devices are provided on the frame. The two liquid supply devices are respectively connected to the two rows of spray heads in a one-to-one correspondence, and each of the liquid supply devices is configured to provide the spray device with vaccine suspension liquid.

REFERENCE LIST

1. frame; 21. conveyor motor; 22. conveyor belt; 3. spray device; 31. spray head; 32. mounting seat; 41. pumping servo motor; 42. pumping piston; 43. first electromagnetic valve; 44. second electromagnetic valve; 5. photoelectric sensor; 6. control box; 7. display; 8. control button; 9. status indicator light; 10. universal wheel; 11. interval telescopic rod; 12. limiting rod; 100, chick frame; 101, telescopic leg; 13, first liquid collector; 14, second liquid collector; 45, liquid storage tank.

DETAILED DESCRIPTION

Figure 1:
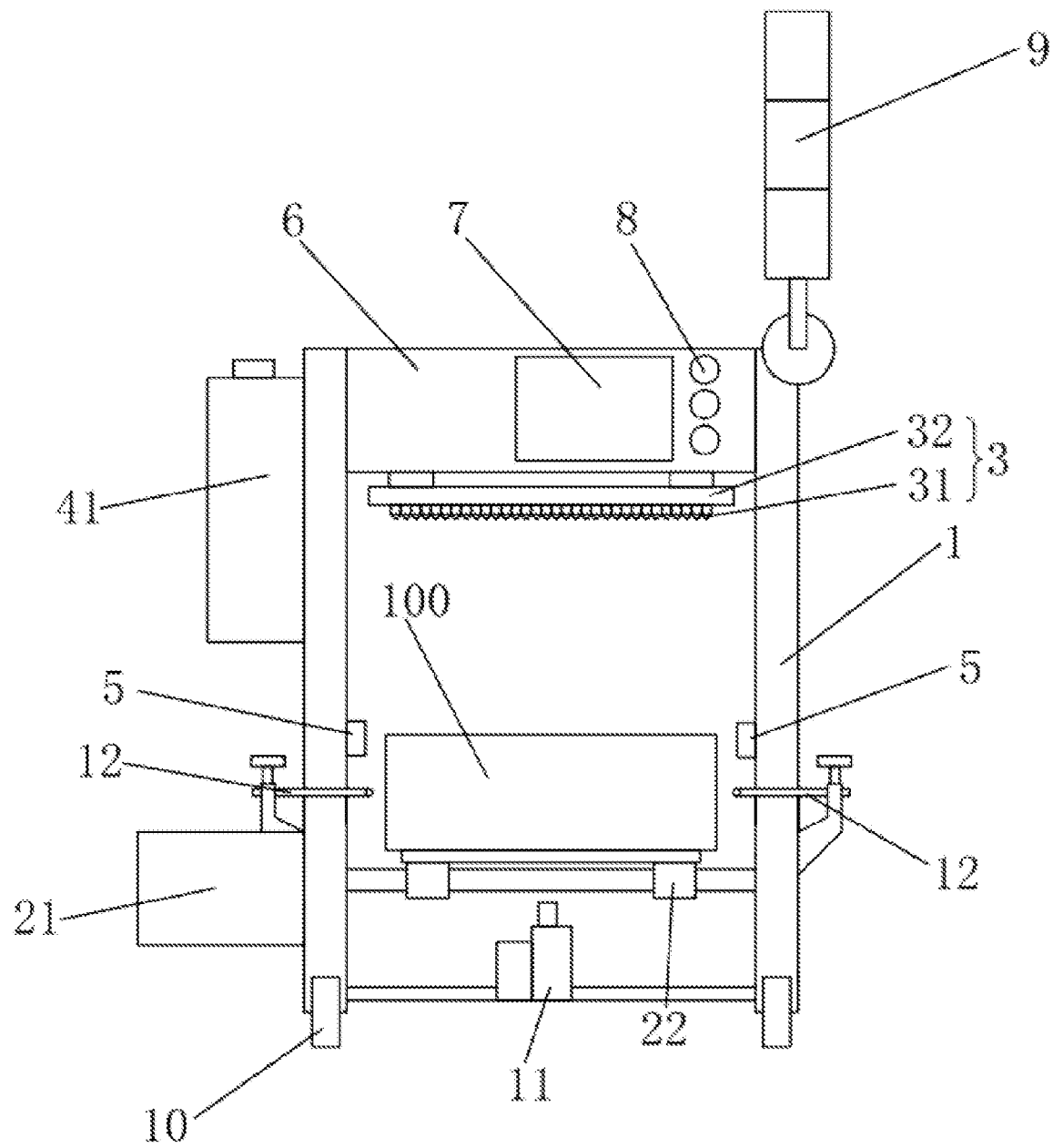
FIG. 1 shows a front view of the vaccine spraying equipment according to an embodiment of the present application.
Figure 2:
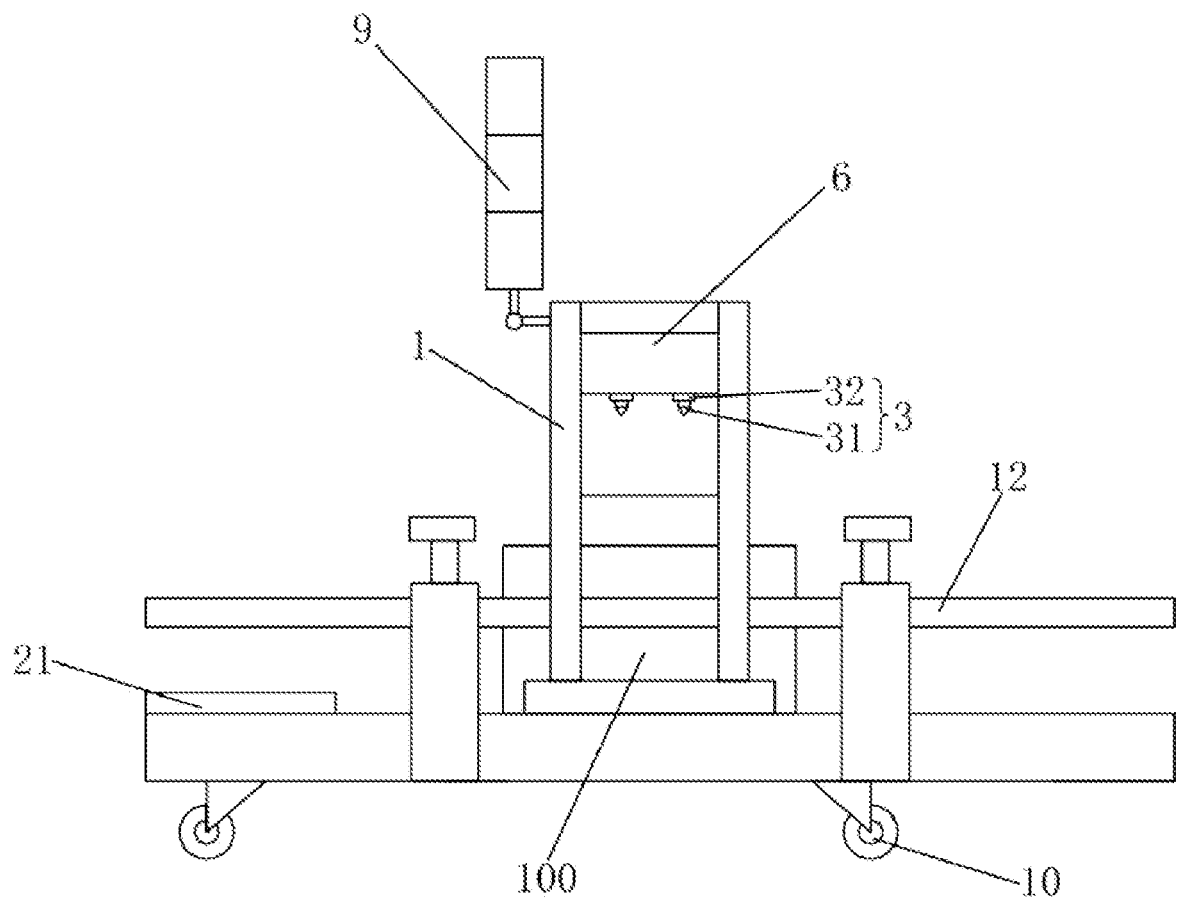
FIG. 2 shows a right side view of the vaccine spray equipment according to an embodiment of the present application.
Figure 3:
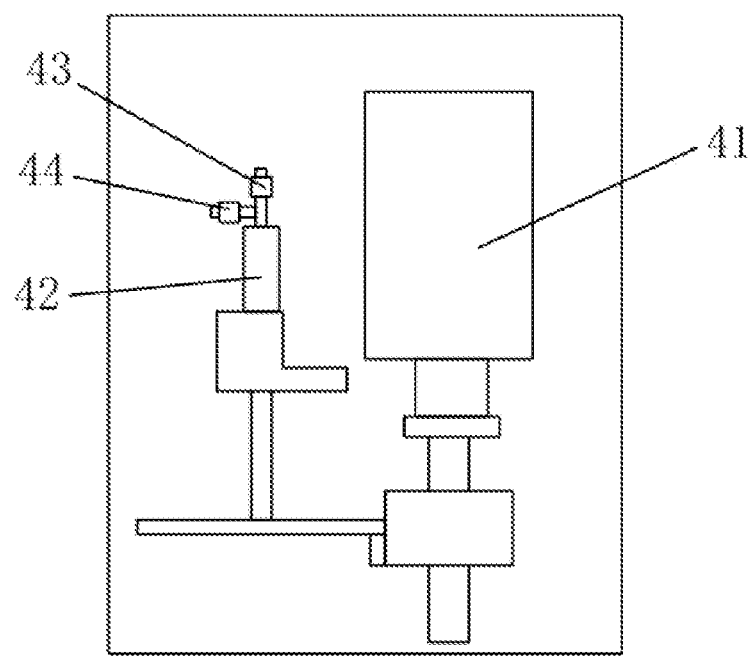
FIG. 3 shows a partial structural view of the vaccine spray equipment according to an embodiment of the present application.

As shown in FIGS. 1 to 3, this embodiment provides a vaccine spray equipment, which is configured to spray vaccine suspension liquid on the chicks in the chick frame 100. The vaccine spray equipment includes a frame 1, a conveying device, a spray device 3 and two liquid supply devices. The conveying device is disposed on the frame 1, and is configured to support and convey the chick frame 100, and the spray device 3 is disposed on the frame 1. The spray device 3 includes two rows of spray heads disposed along the conveying direction perpendicular to the conveying device. The two rows of spray heads 31 are provided side by side above the conveying device. The two liquid supply devices are disposed on the frame 1, and respectively communicate with the two rows of spray heads 31 in a one-to-one correspondence. The liquid supply devices are configured to provide the spray device 3 with a vaccine suspension liquid.

Illustratively, each row of spray heads 31 on the vaccine spray equipment is supplied with vaccine suspension liquid by a separate liquid supply device. When the conveying device drives the chick frame 100 with chicks to pass under the spray device 3, the two rows of the spray heads 31 work alternately or synchronously and intermittently to ensure that the vaccine suspension liquid sprayed by the spray device 3 covers all the chicks in each chick frame 100 which improves the effect of vaccine spraying, and at the same time to avoid the situation that the conveying device needs to be repeatedly paused due to the single-row spray heads 31 to wait for the liquid supply device to re-absorb liquid, thereby improving the efficiency and continuity of vaccine spraying.

Optionally, the liquid supply device includes a liquid storage tank 45, a pumping servo motor 41, and a pumping piston 42, the liquid storage tank 45 is configured to store vaccine suspension liquid, and the pumping servo motor 41 is installed on the frame 1. The pumping piston 42 is in transmission connection with the pumping servo motor 41, the spray device 3 is connected to the liquid storage tank 45 and the pumping piston 42 through a pipeline, and the pumping servo motor 41 drives the pumping piston 42 to reciprocate to pump the vaccine suspension liquid in the liquid storage tank 45 to the spray head 31. Optionally, the pumping piston 42 is in driving connection to the pumping servo motor 41 by a ball screw mechanism.

Illustratively, when one row of spray heads 31 sprays, the pumping piston 42 connected to another row of spray heads 31 returns to its position and sucked up the vaccine suspension liquid. When the row of spray heads 31 to be sprayed has finished spraying to the chicks in the chick frame, the chicks in another chick frame is to be transported to the spraying position, and another row of spray heads 31 can spray the vaccine suspension liquid, which eliminates the time to wait for the pumping piston 42 to return to its position to absorb the liquid. The chick frame 100 can continuously pass through the spray head 31 to improve the spray efficiency. At this time, the spray head 31 sprays 25 ml-40 ml at a time.

Alternatively, the distance between the two rows of spray heads 31 is half the length of the chick frame 100, and the chick frame 100 continuously passes through the spray heads 31. When the chick frame 100 travels a half of the length of the chick frame 100, the two rows of the spray heads 31 starts spraying liquid synchronously. After the chick frame 100 travels another half of the length of the chick frame 100, the two rows of spray heads 31 synchronously stop spraying liquid, and the cycle repeats, in this way, each chick frame 100 can accept the spraying of the two rows of the spray heads 31, and ensure that the vaccine suspension liquid sprayed by the spray device 3 covers all the chicks in each chick frame 100. At this time, the spray volume of each row of the spray heads 31 is 12.5 ml-20 ml.

Optionally, the liquid supply device further includes a first electromagnetic valve 43 and a second electromagnetic valve 44. The first electromagnetic valve 43 is provided on the pipeline between the pumping piston 42 and the spray device 3, and the second electromagnetic valve 44 is provided on the pipeline between the pumping piston 42 and the liquid storage tank 45. The first electromagnetic valve 43 and the second electromagnetic valve 44 respectively control the on and off of the pipelines where they are located.

Optionally, the transmission device includes a conveyor motor 21, a conveyor pulley, a driven wheel, and a conveyor belt 22. The conveyor pulley is drivingly connected to the output end of the conveyor motor 21. The conveyor belt 22 is tensioned on the conveyor pulley and the driven wheel and is configured to carry chick frames 100. Optionally, the conveyor belt 22 has a smooth surface for easy cleaning.

Optionally, two sets each comprising the conveyor pulley, the driven wheel and the conveyor belt 22 are disposed side-by-side, and two conveyor belts 22 in the two sets jointly support the chick frames 100.

Optionally, the spray device 3 further includes two mounting seats 32, and the two mounting seats 32 are respectively connected to the two rows of spray heads 31 in a one-to-one correspondence, and respectively communicate to the two liquid supply devices in a one-to-one correspondence. Illustratively, the mounting seat 32 is provided with two liquid inlets and a plurality of liquid outlets communicating to the two liquid inlets, the liquid inlets are respectively located on both sides of the mounting seat 32, and the pumping piston 42 is connected to the liquid inlets through a three-way pipe. The spray heads 31 are installed on the liquid outlets, respectively.

Optionally, the liquid storage tank 45 is detachably connected to the pipeline. When the vaccine suspension liquid in the liquid storage tank 45 is exhausted, another liquid storage tank filled with vaccine suspension liquid can be directly replaced, which improves the operation continuity of the vaccine spray equipment.

Optionally, the vaccine spray equipment further includes a photoelectric sensor 5, which is provided on the frame 1, and is configured to detect the chick frame 100 on the conveyor belt 22. Illustratively, the photoelectric sensor 5 includes a transmitting end and a receiving end opposite to the transmitting end. The transmitting end and the receiving end are separately provided on the left side and right side of the conveying direction of the two conveyor belts 22. Optionally, the upstream end and the downstream end of the conveyor belt 22 are respectively provided with a photoelectric sensor 5. The photoelectric sensor at the upstream end and the photoelectric at the downstream end are respectively configured to detect the chick frame 100 to be sprayed and the chick frame 100 that has been sprayed.

Optionally, the frame 1 is further provided with an interval telescopic rod 11, which can extend in the vertical direction to penetrate upwards from below the conveyor belt 22 to block the chick frame 100 on the conveyor belt 22 from conveying towards the spraying position to prevent the chick frame 100 from being conveyed forward when the vaccine spray equipment is in an abnormal working state. Illustratively, the interval telescopic rod 11 is an electric push rod.

Optionally, the vaccine spray equipment further includes a control box 6 installed on the frame 1. The control box 6 is provided with a control device, and the control device is electrically connected to the above-mentioned spray device 3, the conveyor device, liquid supply device, photoelectric sensor 5 and interval telescopic rod 11, respectively. The control device can be a centralized controller or distributed controllers, for example, the control device can be an individual single-chip microcomputer, such as STM32 single-chip microcomputer, or the control device can be composed of multiple distributed single-chip microcomputers. The single-chip microcomputer can run the control program, and is electrically connected to and control the spraying device 3, the conveyor device, the liquid supply device, the photoelectric sensor 5 and the interval telescopic rod 11 to realize the functions of the spraying device 3, the conveyor device, the liquid supply device, the photoelectric sensor 5 and the interval telescopic rod 11.

Optionally, the control box 6 is further provided with a display screen 7, which is electrically connected to the control device, and is configured to display the working information of the vaccine spray equipment, such as the running speed of the conveyor belt, the spray mode, and the count of sprayed frames, spray duration, single spray volume, remaining amount of vaccine suspension liquid, and the like.

Optionally, the control box 6 is further provided with a control button 8, which is electrically connected to the control device, and is configured to input control instructions to the vaccine spray equipment, such as emergency braking, switching spraying modes, and adjusting the transmission speed.

Optionally, the control box 6 is further provided with a status indicator light 9 which is electrically connected to the control device. The status indicator light 9 includes at least two colors of light sources, and the status indicator light 9 is configured to indicate that the vaccine spray equipment is in a normal working state or an abnormal working state. In this embodiment, the status indicator light 9 includes red, green, and yellow light sources.

Optionally, the vaccine spray equipment further includes a limiting rod 12, which is installed on the frame 1 and above the conveyor belt 22. The limiting rods 12 are provided on both sides in the conveying direction of the conveying belt 22. The extending direction of the limiting rod 12 is the same as the conveying direction of the conveyor belt 22, and the configuration of the limiting rod 12 can limit the chick frame 100 to be conveyed in parallel along the conveyor belt 22.

Optionally, the vaccine spray equipment further includes a first liquid collector 13, which is movably connected to the frame 1, and the first liquid collector 13 can be moved below the spray head 31 to collect the waste liquid flowing out of the spray head 31 during the exhausting gas or cleaning process.

Optionally, the vaccine spray equipment further includes a second liquid collector 14, which is provided below the position of the conveying device corresponding to the spray head 31, and is configured to collect the waste liquid that flows from the gap of the chick frame 100.

Figure 4:
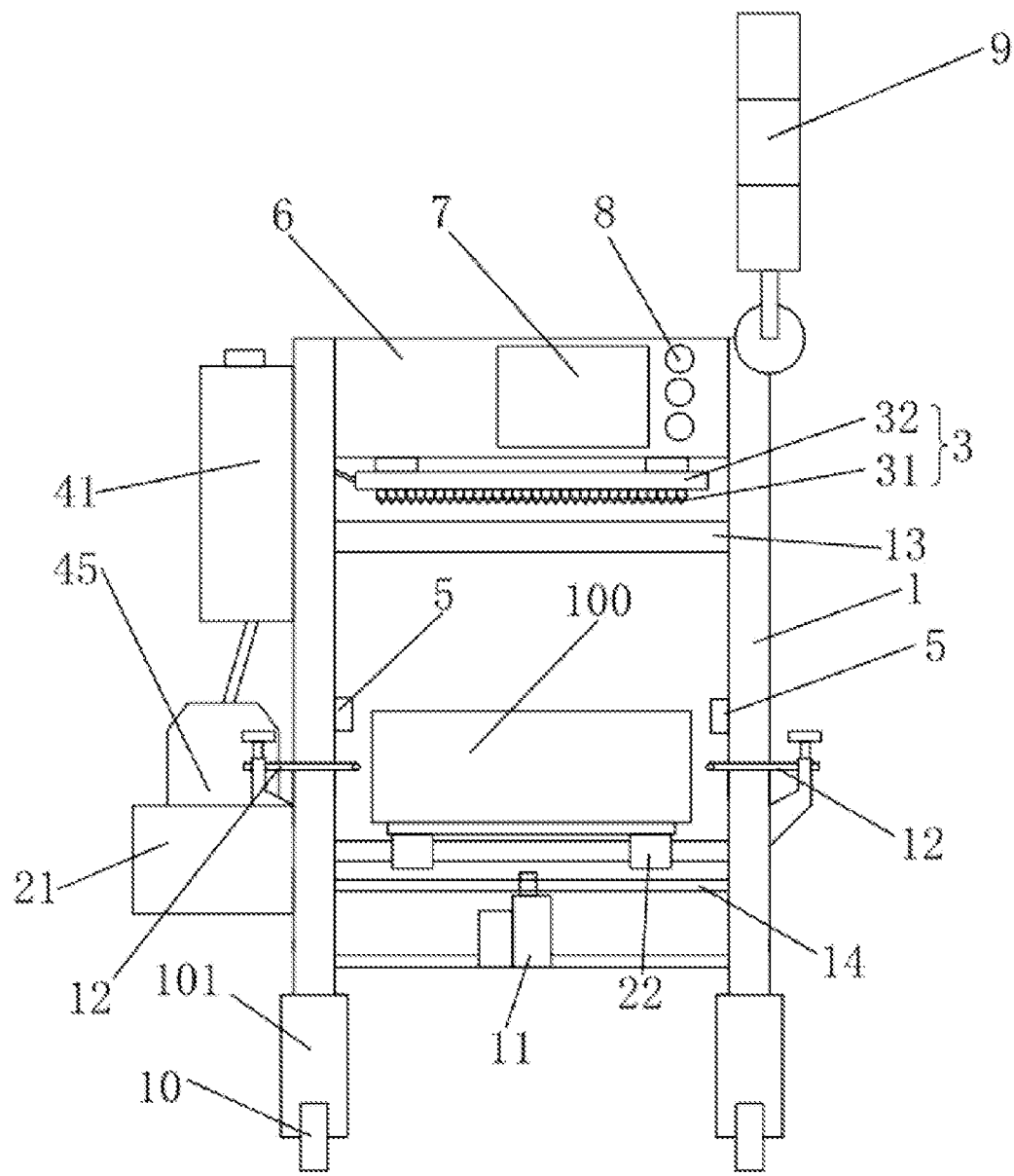
FIG. 4 shows a structural view of the vaccine spray equipment according to an embodiment of the present application.

Optionally, as shown in FIG. 4, the frame 1 includes telescopic legs 101, which are provided in a vertical direction, and the telescopic legs 101 can be extended and retracted in the vertical direction to adjust the height of the frame 1 so as to match the height of other automation equipment.

Optionally, a universal wheel 10 is provided at the bottom of the frame 1, and a brake mechanism is provided on the universal wheel 10 to facilitate the movement or fixation of the vaccine spray equipment as a whole.

What is claimed is:

1. A vaccine spray equipment, comprising:
   a frame;
   a conveying device, wherein the conveying device is disposed on the frame, and is configured to support and convey a chick frame;
   a spray device, wherein the spray device is provided on the frame and includes two rows of spray heads provided along the conveying direction perpendicular to the conveying device, the two rows of spray heads are provided side by side above the conveying device; and
   two liquid supply devices provided on the frame, wherein the two liquid supply devices are respectively connected to the two rows of spray heads in a one-to-one correspondence, and each of the liquid supply devices is configured to provide the spray device with vaccine suspension liquid and
   wherein the frame is further provided with an interval telescopic rod, and the interval telescopic rod is extendable in the vertical direction, so as to penetrate upwards from below the conveying device to block the chick frame from conveying towards a spraying position.

2. The vaccine spray equipment according to claim 1, wherein the conveying device comprises:
   a conveyor motor;
   a conveyor pulley, which is in transmission connection to an output end of the transmission motor;
   a driven wheel; and
   a conveyor belt is tensioned on the conveying pulley and the driven wheel, and is configured to carry the chicken frame.

3. The vaccine spray equipment according to claim 1, wherein the spray device further comprises two mounting seats, and the two mounting seats are respectively connected to the two rows of spray heads in a one-to-one correspondence, and respectively in communication with the two liquid supply devices in a one-to-one correspondence.

4. The vaccine spray equipment according to claim 1, wherein the liquid supply device comprises:
   a liquid storage tank, configured to store the vaccine suspension liquid;
   a pumping servo motor installed on the frame; and
   a pumping piston, wherein the pumping piston is in transmission connection with the pumping servo motor, and the pumping piston is in communication with the liquid storage tank and the spray device through pipelines; the pumping servo motor is configured to drive the pumping piston to reciprocate to pump the vaccine suspension liquid in the liquid storage tank to the spray head.

5. The vaccine spray equipment according to claim 4, wherein the liquid storage tank is detachably connected with the pipelines.

6. The vaccine spray equipment according to claim 1, further comprising at least one of the following:
   a first liquid collector, wherein the first liquid collector is movably connected to the frame, and the first liquid collector is capable of moving below the spray head to collect exhaust gas or waste liquid flowing out from the spray head in a cleaning process; or
   a second liquid collector, wherein the second liquid collector is provided below a position of the conveying device corresponding to the spray head, and is configured to collect the waste liquid flowing from a gap of the chick frame.

7. The vaccine spray equipment according to claim 1, further comprising a photoelectric sensor, wherein the photoelectric sensor is provided on the frame and is configured to detect the chick frame.

8. The vaccine spray equipment according to claim 1, further comprising: a status indicator light, wherein the status indicator light is provided on the frame, the status indicator light comprises at least two colors of light sources, and the status indicator light is configured to indicate that the vaccine spray equipment is in a normal working state or an abnormal working state.

9. The vaccine spray equipment according to claim 1, wherein the frame comprises: telescopic legs, the telescopic legs are provided in a vertical direction, and are capable of being telescopic in the vertical direction to adjust the height of the frame.

10. The vaccine spray equipment according to claim 2, further comprising a photoelectric sensor, wherein the photoelectric sensor is provided on the frame and is configured to detect the chick frame.

11. The vaccine spray equipment according to claim 3, further comprising a photoelectric sensor, wherein the photoelectric sensor is provided on the frame and is configured to detect the chick frame.

12. The vaccine spray equipment according to claim 4, further comprising a photoelectric sensor, wherein the photoelectric sensor is provided on the frame and is configured to detect the chick frame.

13. The vaccine spray equipment according to claim 5, further comprising a photoelectric sensor, wherein the photoelectric sensor is provided on the frame and is configured to detect the chick frame.

14. The vaccine spray equipment according to claim 2, further comprising at least one of the following:
- a first liquid collector, wherein the first liquid collector is movably connected to the frame, and the first liquid collector is capable of moving below the spray head to collect exhaust gas or waste liquid flowing out from the spray head in a cleaning process; or
- a second liquid collector, wherein the second liquid collector is provided below a position of the conveying device corresponding to the spray head, and is configured to collect the waste liquid flowing from a gap of the chick frame.

15. The vaccine spray equipment according to claim 2, wherein the frame comprises: telescopic legs, the telescopic legs are provided in a vertical direction, and are capable of being telescopic in the vertical direction to adjust the height of the frame.

\* \* \* \* \*